INVENTOR.
John T. Black
BY
R. M. Holbrook
ATTORNEY

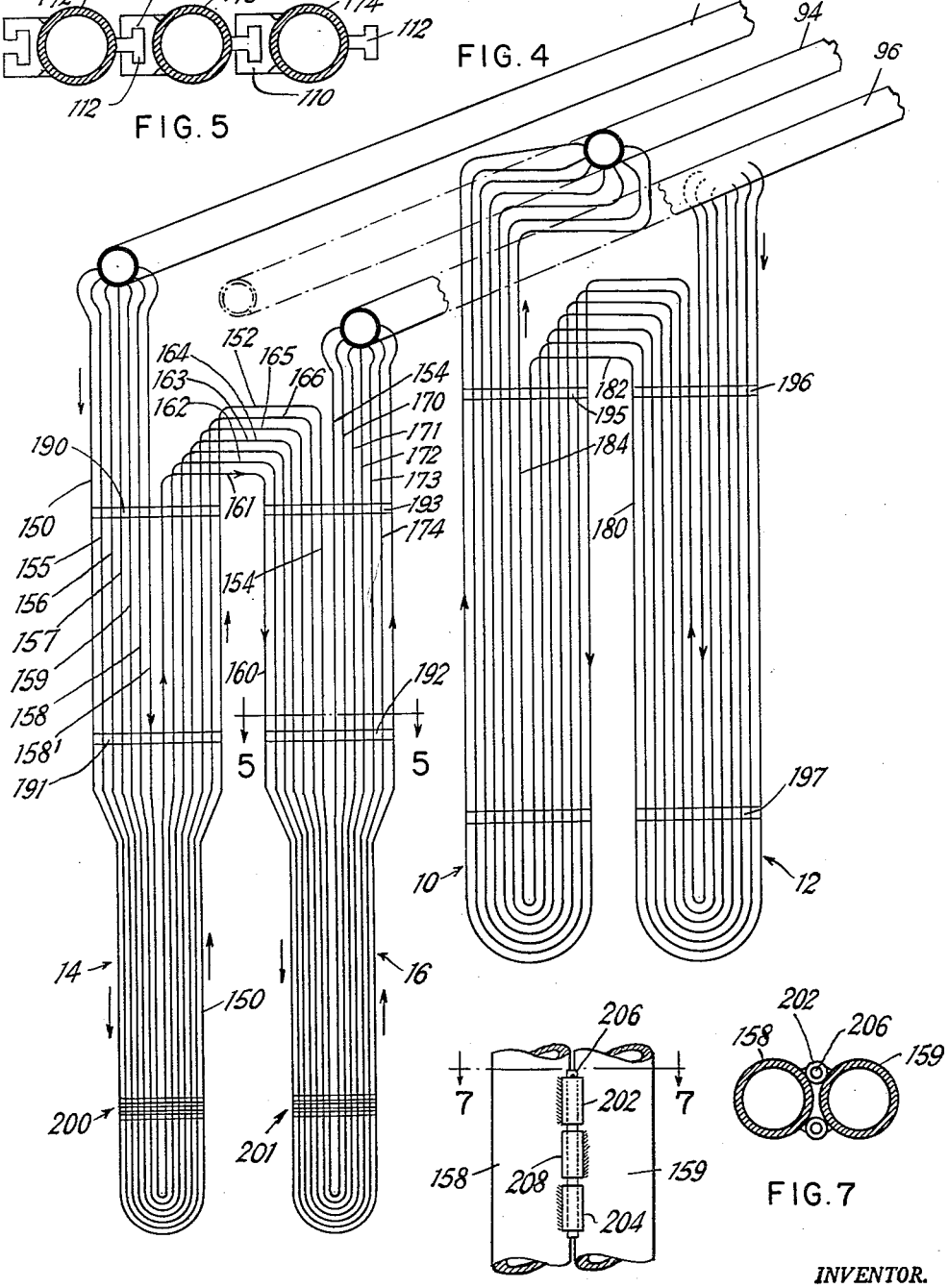

United States Patent Office 2,809,616
Patented Oct. 15, 1957

2,809,616

VAPOR GENERATING AND SUPERHEATING UNIT WITH PENDENT SUPERHEATER PLATENS

John T. Black, Rumson, N. J., assignor to The Babcock & Wilcox Company, New York, N. Y., a corporation of New Jersey Application March 21, 1952, Serial No. 277,831

4 Claims. (Cl. 122—478)

This invention relates to vapor generating and superheating units, and more particularly, the invention involves improvements in superheaters for such units.

The invention involves a superheater including spaced platens of contiguous tubes conducting vapor at high temperature, and exposed exteriorly to the high temperatures of combustion in a furnace burning a slag forming fuel. The temperatures of the gases, and the slag particles carried thereby, contacting the superheater tubes are well above values at which slag particles tend to accumulate upon the tubes, and the invention involves such superheater tube construction and arrangement as to minimize the operational difficulties resulting from such slagging conditions. To this end the superheater platens are widely spaced, in the pertinent furnace zones of highest temperature, to prevent the bridging of successive platens by converging slag deposits. In zones of lower temperatures the superheater platens are arranged on smaller spacing to attain optimum superheated vapor temperatures. A preferred embodiment includes an arrangement in which long and short pendent platens are arranged in alternation with the lower parts of the longer platens much closer to the furnace firing means, or the highest temperature zone of the furnace. Parts of the platens, particularly the lower parts have their successive contiguous tube components substantially in contact, or are more closely arranged, to facilitate the periodic removal of slag accumulations.

The features of novelty which characterize the invention are pointed out with particularity in the claims annexed to and forming a part of this specification, but, for a better understanding of the invention, its operating advantages, and objects, reference should be had to the accompanying drawings and descriptive matter in which a preferred embodiment is illustrated and described.

In the drawings:

Fig. 4 is a schematic view, showing the cross-over connections for the Fig. 1 superheater platens;

Fig. 5 is a fragmentary horizontal section of the tube spacer construction used in the superheater platens in lower temperature zones;

Fig. 6 is a fragmentary elevation of the tube-tie construction employed in the parts of the long superheater platens nearest the furnace gas zones of highest temperature; and Fig. 7 is a fragmentary horizontal section on the line 7—7 of Fig. 6.

Figure 1:
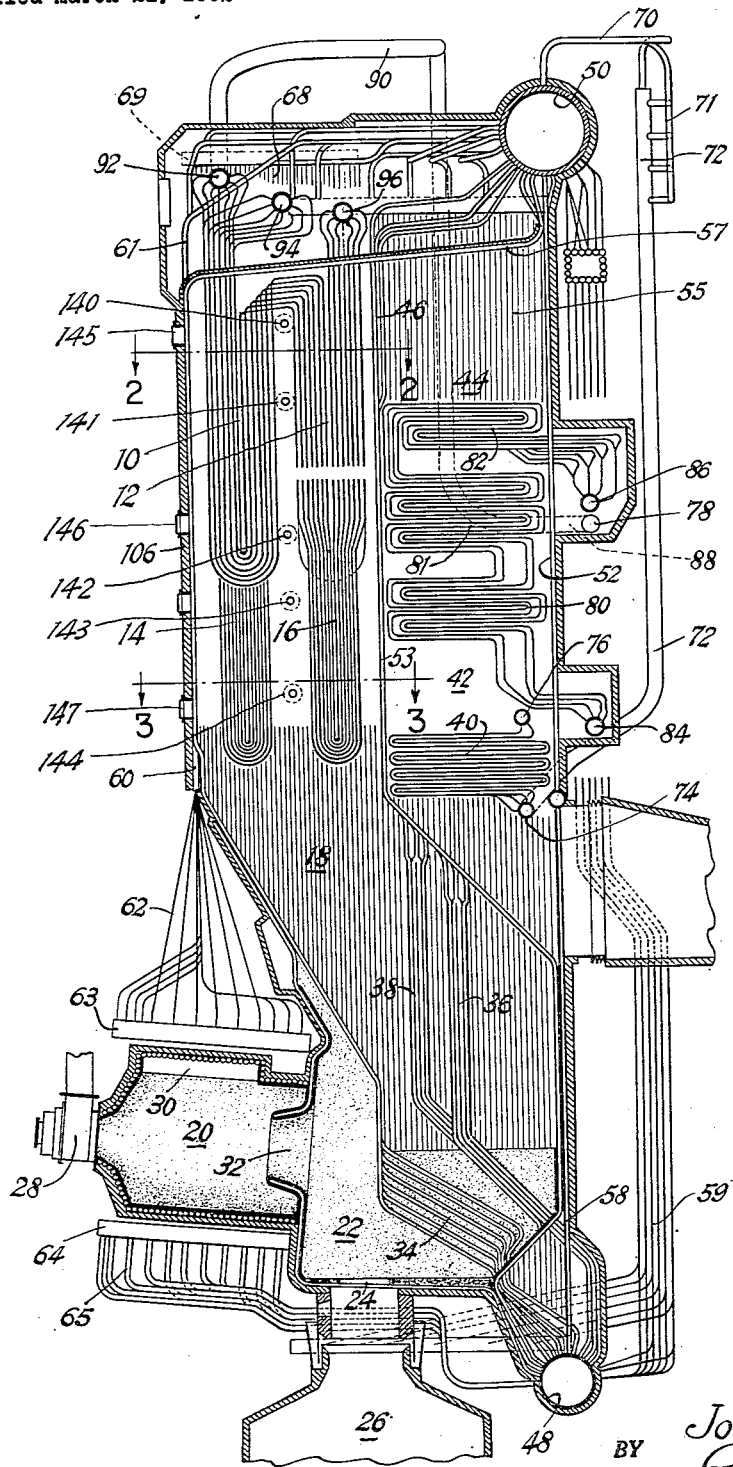
Fig. 1 is a sectional elevation of a vapor generating and superheating unit embodying the invention.

The Fig. 1 unit involves short superheater tube platens 10 and 12 and long superheater platens 14 and 16 pendently supported within the furnace chamber 18 which has a zone of highest gas temperature below the platens. The furnace chamber 18 is supplied with furnace gases by a cyclone furnace, burning an ash or slag forming fuel and operating at temperatures well above the fusion temperatures of the ash. This furnace includes the cyclone 20 and the primary furnace chamber 22, the latter receiving molten slag from the cyclone, the predominant proportion of the slag being separated from the gases so as to flow through the opening 24 into the slag pit 26.

The cyclone furnace and its associated components are constructed and arranged in a manner similar to that indicated in the United States patent to Bailey et al., 2,357,301 of September 5, 1944. In its operation, crushed coal and preheated primary air are delivered tangentially to the cyclone inlet 28. High temperature secondary air is admitted through the inlet 30, and the combustion gases with slag particles therein exit from the cyclone through its outlet 32, in a turbulent condition. Although most of the slag is separated from the gases in the zone of the primary chamber 22 the gases still carry appreciable amounts of slag particles as they pass from the tubular screens 34, 36, and 38 into the furnace chamber 18.

To obtain optimum superheat of the order of 1050° F., the lower parts of the longer superheater platens 14 and 16 are disposed in the zones of high gas temperatures. In these zones the slag particles carried by the gases stick to and accumulate upon these parts of the superheater. This action presents difficulties as to reductions in heat transfer rates to the superheated vapor, but these difficulties are minimized by making the side spacing of the platens 14 so great that slag cannot bridge across them, and also by the arrangement of the contiguous tube sections of the lower parts of platens 14 and 16 in tube-to-tube relationship. The superheater of which the platens are components is a high temperature superheater receiving vapor already superheated in its flow through the banks of tubes of a primary superheater. One bank of such tubes is indicated at 40. These tubes are disposed across downward furnace gas flow in the gas pass 42 receiving furnace gases through the gas turning space 44 from the gas outlet 46 at the top of the furnace chamber 18. The walls of the gas pass include vapor generating tubes appropriately connected into the circulation system of the unit. Some of these vapor generating tubes and their circulatory connections to the drums 48 and 50 are indicated at 52, 53, 55 and 57—59. Similar vapor generating tubes and connections 60—65, 68, and 69 are included in the construction of the cyclone furnace, the furnace chamber 18, and the tubular screens 34, 36, and 38.

Vapor and liquid mixtures flow from the vapor generating tubes to the drum 50 in which the vapor is separated for flow through the tubular connections 70—72 to inlet header 74 of the primary superheater. From the intermediate header 76 of this superheater, the steam flows through other banks of primary superheater tubes to the primary superheater outlet header 78. These other banks of primary superheater tubes are similar in construction and arrangement to the banks 80—82 of reheater tubes which conduct steam from the reheater inlet header 84 to the reheater outlet header 86. However, the reheater extends only part way across the gas pass 42, the similar primary superheater tubes occupying the remainder of the flow area of the gas pass.

From the primary superheater outlet header 78 the steam flows through a conduit 88 to the attemperator 90 and then to the secondary superheater inlet header 92. From this header the steam flows in parallel through the U-tubes of the long superheater platens 14 and then through the tubes of the long superheater platens 16 to the intermediate secondary superheater header 96 at distributed positions between the inlets of the tubes of the shorter secondary superheater tube platens 12. It then flows through the tubes of the short platens 10 to the secondary superheater outlet header 94 from which the high temperature superheated vapor flows to a point of use.

Figure 2:
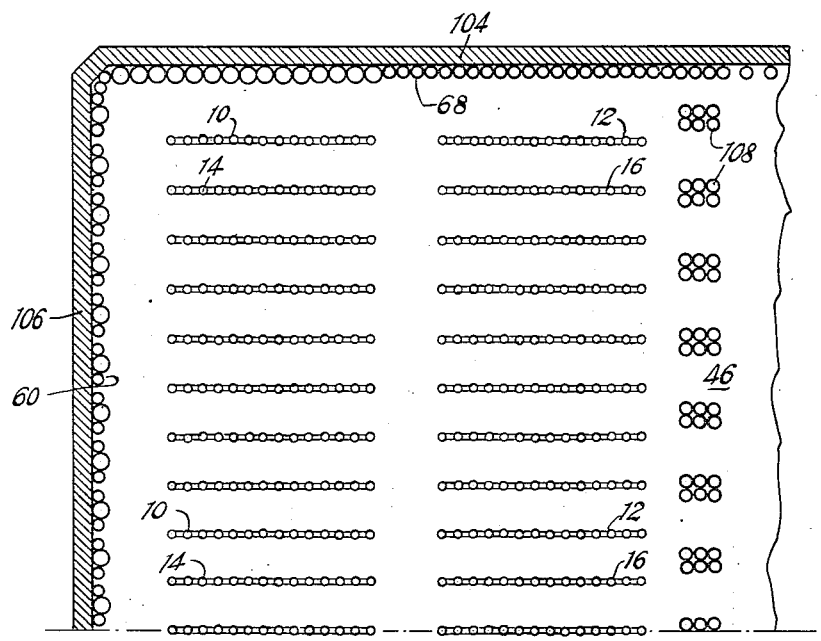
Fig. 2 is a partial transverse section on the line 2—2 of Fig. 1, showing the narrow spacing of the superheater platens in a zone of lower gas temperature.

Fig. 2 of the drawings is a half section on the horizontal plane of the section line 2—2 of Fig. 1 showing the spacing of the platens. This figure shows the uniform spacing of the platens near the top of the unit in a zone of lower gas temperature.

Fig. 2 also indicates one of the side walls 104 of the unit, and also the front wall 106 having the vapor generating tubes 60 arranged in contiguous relation therewith. This view further shows the groups or bundles of tubes 108 formed across the furnace gas outlet 46 by the upper parts of the vapor generating tubes 53.

Figure 3:
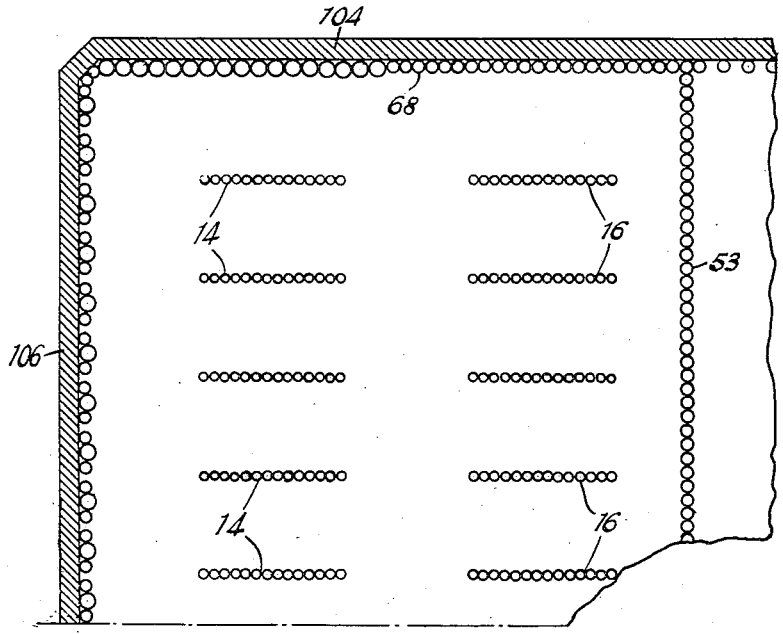
Fig. 3 is a half section of the Fig. 1 unit on the line 3—3 of Fig. 1, showing the wider spacing of the superheater platens in a zone of high temperature.

Fig. 3 is a half horizontal section taken on a plane below the shorter superheater platens, and indicating the wider side spacing of the long platens such as 14 and 16.

At widely spaced vertical positions (such as 190—197) the tubes of each platen are connected by rows of clevises including slidably interfitting parts 110 and 112. This arrangement is clearly indicated in Fig. 5. Each of the clevises permits relative longitudinal movement between the separate tubes with the T-slotted clevis part such as 112 sliding within the T-slotted clevis part 110.

At positions 200 and 201 the tubes of the lower parts of the long platens are held in operative relationship by devices such as shown in Figs. 6 and 7. Here, for example, the sleeves 202 and 204, welded to the tube 158, have a pin 206 extending therethrough and also through a similar sleeve 208 welded to tube 159.

The disclosure of the long platen 16 in Figs. 1 and 4 shows the lower parts of the tubes of this platen to be arranged in closely spaced, or tube-to-tube relationship so as to form a relatively continuous platen structure from which the slag may be removed with increased facility. Above the lower part of this platen the tubular components are spaced apart so that the upper parts of these long platens are wider than the lower parts.

Slag removal devices operate through the side walls of the installation at positions indicated at 140—144 in Fig. 1, and similar devices are preferably provided in the front wall and the other side wall.

Also, for facilitating slag removal, lance doors are provided in the front wall as indicated at 145—147.

To maintain the superheater tube metal within allowable limits, and more specifically to prevent the outside tubes of the superheater platens from having excessively high temperatures, the cross-over tube arrangement of Fig. 4 is provided. In this arrangement the outside U-tube 150 of each long platen has its outlet connected by the cross-over tube 152 to the inside U-tube 154 of an aligned platen 16, and, conversely, the inside U-tubes 158' of the platens 14 are connected to the outside U-tubes 160 of platens 16 by cross-over tubes such as 161. Similar intermediate cross-over tubes 162—166 connect U-tubes 155—159 of platens 14 to the intermediate U-tubes 170—174, in a similar manner.

The shorter platens 10 and 12 are connected in a manner similar to that above described for the longer platens, the outside U-tube 180 of each platen 12 being connected by a cross-over tube 182 to an inside U-tube 184 of an aligned platen 10.

The above described cross-over connections function to prevent operative unbalance in the heating of the different superheater tubes. For example, the outside U-tubes are so disposed with reference to the furnace, and furnace gases, that they are subject to rates of heat absorption greater than the heat absorption rates of the inner U-tubes.

The inner U-tube 158' of platen 14 has a compensating heating effect, relative to the heating effect of the connected outer U-tube 160 of platen 16, and similarly, each of the intermediate U-tubes 155—158 of platen 14, has a compensating effect, relative to the heating effect of its connected U-tube, of the intermediate U-tubes 170—174 of the platen 16.

Similar considerations also apply to the connections of the U-tubes of the platens 10 and 12.

Both long and short superheater platens are pendently supported, partly by the headers 92 and 96, and partly by appropriate hangers secured to the intermediate parts of the platens constituting the cross-over tubes.

In the Fig. 1 unit most of the superheater platens, in the lower temperature zone, are arranged on twelve inch spacing, while the longer platens are arranged on twenty-four inch spacing in the higher temperature zone, nearest the highest temperature zone of the furnace chamber. The platens are about four feet wide in the lower temperature zone, and the front-to-back dimension of the upper part of the furnace chamber (at the location of the superheater platens) is about twelve feet.

The term platen is used herein to designate a flat structure formed by a multiplicity of successive and connected fluid heating tubes or tube sections. The term is also used to designate a series of connected return bend fluid heating tubes forming a flat structure, or to designate a flat structure formed by a series of nested U-tubes of fluid heat exchange apparatus.

It is to be noted that the spacing of the platens at positions nearest the cyclone 20 are much wider than the spacings of the platens at positions further away from the cyclone 20. With this arrangement in mind, it may be considered that the spacings of the platens are reversely related to the zone of highest gas temperature, or reversely related to the distances from the center of the zone of highest gas temperature.

I claim:

1. In a vapor generating and superheating unit, a furnace chamber having walls including vapor generating tubes, fuel burning means firing the furnace with a slag forming fuel at high temperature above the slag fusing temperature, a convection section heated by the combustion gases after they have left the furnace, first and second adjacent rows of upright spaced long platens of superheater tubes disposed within said chamber with short superheater platens in the rows and between the long platens, each of said platens including series connected parallel tube sections, the long platens having parts disposed at positions much nearer the highest gas temperature zone of the furnace chamber than the short platens, means conducting a generated vapor from the vapor generating tubes to the inlets of the tubes of the long superheater platens, means connecting the outlets of the long platens to the inlets of the short platens, crossover tubes connecting the outlets of the long platens of the first row to inlet tubes of corresponding long platens of the second row, said crossover tubes connecting the inside platen tubes in the first row to the outside platen tubes of the second row and also connecting the outside platen tubes in the first row to the inside platen tubes of the second row, and a similar arrangement of crossover tubes between the short platens in the second row to corresponding short platens in the first row.

2. In a vapor generating and superheating unit, vapor generating tubes defining the boundaries of a furnace chamber, means firing the furnace at high tmeperatures with a slag forming fuel, a convection section heated by the furnace gases after they have left said chamber, and a predominantly radiant superheater including successive parallel flow vapor heating tubes arranged as upright platens uniformly horizontally and widely spaced in high temperature gas zones between the convection section and the zone of highest furnace temperatures and directly exposed to radiant heat transmission from the furnace chamber, each platen consisting of a plurality of nested U-tubes of successively smaller curvature and lengths, some of the uniformly spaced platens of the vapor heating tubes being much longer than the interposed platens and having their lower parts extending to positions much nearer the zone of highest furnace chamber gas temperatures than the remaining platens, the lower part of each longer platen being of a length equal to a substantial part of the total length of the longer platen, the lower parts of the longer platens nearest the zone of highest furnace temperature having their several successive parallel flow tubular components contiguously arranged more closely together than the remaining parts of the same platens, the inter-tube spacing in each platen being much less than the side-to-side spacing of the successive platens.

3. In a vapor generating and superheating unit, a high temperature vapor generating section including furnace having walls including vapor generating tubes, means firing the furnace at high temperatures, a convection section heated by the furnace gases after they have left the furnace, a predominantly radiant superheater including vapor heating tubes arranged in platens in high temperature gas zones between the convection section and the zone of highest furnace temperatures and exposed to direct radiant heat from the latter zone, said platens being arranged in two rows, alternate platens in each row being much longer than the interposed platens and having their lower parts extending to positions much nearer the zone of highest furnace gas temperatures than the remaining platens, each platen consisting of a plurality of nested U-tubes of successively smaller curvature and length, the lower parts of the nested U-tubes of the longer platens having their successive and parallel tubular components contiguously arranged more closely together than the remaining parts of the same platens and more closely together than the tubular components of the shorter platens, the lower part of each longer platen having the contiguous tubular components being of a length equal to a substantial part of the total length of the platen, and crossover tubes connecting the outlet ends of the inner U-tubes of platens in one of said rows to the inlets of outer U-tubes of platens in the other row, each of said platens having such crossover tubes associated therewith.

4. In a unit for generating and superheating high pressure steam, wall means including steam generating tubes and forming a fuel fired furnace chamber and a gas pass leading therefrom, a tubular steam heater including first and second rows of multiple tube pendent platens distributed in spaced relationship in the gas flow through the unit, each platen including several U-tubes in nested formation with their long axes in substantial alignment so as to constitute a flat tubular structure, the line of each row of platens being transverse to the plane of each platen, and crossover tubes connecting the steam outlet legs of the U-tubes of each platen in one row with the inlet legs of the U-tubes of a platen in a second row, the crossover tube leading from the outside U-tube of a platen in one row to the inside U-tube of a platen in the next row and the crossover tube from the innermost U-tube of a platen in the first row leading to the outside U-tube of a platen in the second row, and the intervening crossover tubes leading in succession from a first row platen beginning with the U-tube next to the outside U-tube and continuing to the U-tube next to the innermost U-tube, the successive intervening crossover tubes in said succession being connected successively to the intervening U-tubes of a second row platen beginning with the U-tube next to the innermost U-tube of a second row platen and continuing to its U-tube next to its outermost U-tube.

References Cited in the file of this patent

UNITED STATES PATENTS

| Re. 20,192 | Barnes | Dec. 8, 1936 |
| 1,843,132 | Huet | Feb. 2, 1932 |
| 1,948,939 | Noack | Feb. 27, 1934 |
| 2,063,441 | Kerr | Dec. 8, 1936 |
| 2,079,104 | Brandt | May 4, 1937 |
| 2,132,658 | Southcott | Oct. 11, 1938 |
| 2,213,185 | Armacost | Sept. 3, 1940 |
| 2,308,762 | Krug et al. | Jan. 19, 1943 |
| 2,403,237 | Powell et al. | July 2, 1946 |
| 2,415,123 | Zoller | Feb. 4, 1947 |
| 2,519,566 | Hamm | Aug. 22, 1950 |
| 2,567,058 | Dalin et al. | Sept. 4, 1951 |
| 2,715,019 | Walter | Aug. 9, 1955 |

FOREIGN PATENTS

| 832,563 | France | Sept. 29, 1938 |

OTHER REFERENCES

B & W Bulletin, G 67–A of 1950, page 13.